United States Patent [19]
Kainer et al.

[11] Patent Number: 4,935,392
[45] Date of Patent: Jun. 19, 1990

[54] PROCESS FOR THE MANUFACTURE OF CATALYST MEMBERS FOR THE REDUCTION OF OXIDES OF NITROGEN AND CATALYST MEMBERS PRODUCED THEREBY

[75] Inventors: Hartmut Kainer, Wiesbaden; Bernhard Vedder, Kelkheim; Daniel Grimm, Bad Schwalbach; Wilfried Schnelle, Wiesbaden; Albert Kleinevoss, Höhr-Grenzhausen; Hans-Eugen Bühler, Königstein; Klaus Merkel; Claus Flockenhaus, both of Essen; Karl-Heinrich Laue, Hattingen; Manfred Galow, Essen, all of Fed. Rep. of Germany

[73] Assignees: Didier-Werke AG, Wiesbaden; Didier Engineering GmbH, Essen, both of Fed. Rep. of Germany

[21] Appl. No.: 330,335

[22] Filed: Mar. 29, 1989

[30] Foreign Application Priority Data

Mar. 30, 1988 [DE] Fed. Rep. of Germany ....... 3810761

[51] Int. Cl.$^5$ .................... B01J 29/04; B01J 37/00; B01J 35/00
[52] U.S. Cl. ..................... 502/60; 502/319; 502/338; 502/527
[58] Field of Search .............. 502/60, 62, 84, 527, 502/319, 338

[56] References Cited

U.S. PATENT DOCUMENTS

| 3,956,192 | 5/1976 | Nicolai | 252/477 R |
| 4,248,736 | 2/1981 | Fuchigami et al. | 502/527 |
| 4,293,447 | 10/1981 | Inaba et al. | 502/527 |
| 4,806,427 | 2/1989 | Stein et al. | 502/60 |

FOREIGN PATENT DOCUMENTS

| 2353640 | 5/1978 | Fed. Rep. of Germany . |
| 2846476 | 1/1981 | Fed. Rep. of Germany . |
| 2927246 | 11/1983 | Fed. Rep. of Germany . |
| 19400 | 2/1982 | Japan | 502/527 |

Primary Examiner—Carl F. Dees
Attorney, Agent, or Firm—Nils H. Ljungman

[57] ABSTRACT

This invention relates to a process for the manufacture of catalysts for the reduction of oxides of nitrogen from exhaust gases and in chemical air cleaning processes in which a catalytically active material containing iron ores, chromium ores and/or zeolite is placed in contact with a carrier means having a series of openings; e.g., wire mesh, expanded or perforated metal or any type of grid-like structure to form a catalytic member. The carrier means is etched with an acid etchant before forming the catalytic member or, instead, the catalytic member is etched with an acid etchant. The catalytic member is bonded by a thermal treatment; e.g., drying, tempering and/or fixing. This invention also relates to catalytic members or products produced by the process. This invention proposes the use of pressure bonding to obtain a catalytic member product which has significantly improved catalytic activity, greater mechanical strength and higher resistance to chipping.

18 Claims, 1 Drawing Sheet

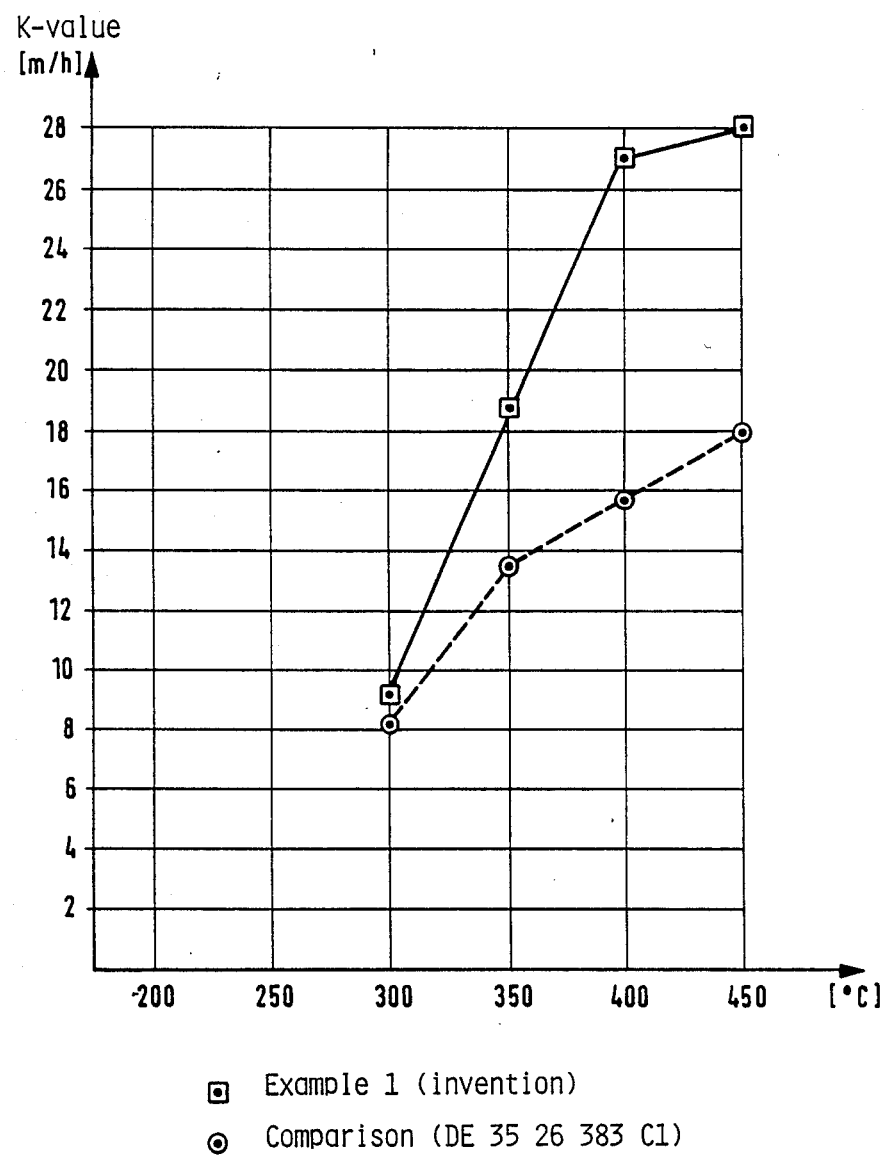

PROCESS FOR THE MANUFACTURE OF CATALYST MEMBERS FOR THE REDUCTION OF OXIDES OF NITROGEN AND CATALYST MEMBERS PRODUCED THEREBY

BACKGROUND OF THE INVENTION

1. Field of the Invention

This invention relates to a process for the manufacture of catalysts for the reduction of oxides of nitrogen from exhaust gases and in chemical air cleaning processes in which a catalytically active material containing iron ores, chromium ores and/or zeolite is placed in contact with a carrier means having a series of openings; e.g., wire mesh, expanded or perforated metal or any type of grid-like structure, to form a catalytic member. The carrier means is etched with an acid etchant before forming the catalytic member or, instead, the catalytic member is etched with an acid etchant. The catalytic member is bonded by a thermal treatment; e.g., drying, tempering and/or fixing. This invention also relates to catalytic members and products produced by the process.

2. Description of the Prior Art

U.S. Pat. No. 4,806,427, issued on Feb. 21, 1989, corresponding to German Patent No. DE 35 26 383 C1, discloses a process of the type described above, in which a so-called composite catalyst is obtained; i.e., a catalyst whose mechanical structure is improved by the inclusion of a perforated metal support, for example. In accordance with this method of the prior art, the metal support is etched with acid, either by bringing the metal support into contact with a mixture of catalytically active material and acid, or by previously etching the metal support by immersing it in acid. In this method of the prior art, sulfuric acid is used as the etching acid.

In the prior art process, the catalytically active material can comprise natural raw materials such as iron ore, chromium ore or zeolite and/or synthetic substances and/or industrial by-products such as slags, sludges or scale. It is also possible to add activators, e.g. elements or oxides of the 7th and 8th principal group of the periodic system, to these catalytically active materials.

OBJECT OF THE INVENTION

An object of the present invention is to produce a catalytic member of the type described above which has improved catalytic activity together with improved mechanical strength, characterized by substantially greater resistance to chipping of the catalytically active material from the carrier means even when subjected to rigorous testing; e.g., bend tests.

Another object of the invention is to produce a catalytic member of the type described above which permits use of larger grain or particle size catalytically active material.

Still a further object of the invention is the provision of a product made by the above processes having greater catalytic activity and enhanced mechanical strength.

SUMMARY OF THE INVENTION

Surprisingly, it has now been found that it is possible to produce catalysts with greater catalytic activity from the same primary materials and, at the same time, obtain a significantly better mechanical bonding of the catalytically active materials to the metal support if the procedures described herein are used.

The above-mentioned objects are accomplished by a process characterized by the fact that the carrier; e.g., a perforated metal support, is inserted on one layer or between two layers of the active material and then molded at a pressure of at least 0.5 newtons per square millimeter ($N/mm^2$) for example, at a pressure of at least 2 to 5 $N/mm^2$ or even higher.

In accordance with a preferred embodiment, the molding pressure is in the range of 20 or 30 to 80 $N/mm^2$ and, advantageously, in the range of 30 or 40 to 60 $N/mm^2$, in order to obtain catalysts which have particularly good mechanical strength and resistance to chipping coupled with enhanced catalytic activity.

In accordance with another preferred embodiment, the metal support is etched (for example, with sulfuric acid) by a prior acid treatment. Such a treatment improves the bonding of the catalytically active material on the support.

In accordance with still another preferred embodiment, the molded body of catalytically active material and perforated metal support is treated with acid to etch the metal support and possibly to convert a portion of the oxides present in the catalytically active material into the corresponding salts; e.g., sulfates.

In accordance with yet another preferred embodiment, the catalytically active material is used together with a thermosetting synthetic resin and, after the composite body is molded, it is subjected to heat treatment to harden the synthetic resin.

A particularly preferred synthetic resin is a phenol novolak resin with a suitable hardener, preferably hexamethylene tetramine.

In accordance with another preferred embodiment, such a composite body produced with a thermosetting synthetic resin is treated with the acid, after the hardening of the thermosetting resin, to etch the metal support.

BRIEF DESCRIPTION OF THE DRAWINGS

The drawing is a graph plotting the catalytic activity at various temperatures of a product made by the process of this invention and the chemical activity of a prior art product under like conditions.

DESCRIPTION OF THE PREFERRED EMBODIMENTS

In accordance with this invention, the principal ingredients of the catalyst are advantageously iron ores or chromium ores, i.e. ores which contain iron oxide or mixtures of iron oxide and chromium oxide, possibly with manganese oxide and other oxides. Preferably, these are ores with high concentrations of $Fe_2O_3$ or $Fe_3O_4$ or $Cr_2O_3$. These ores are generally used in a suitably granulated form, e.g. with grain sizes of up to 1 to 2 mm.

If necessary, activating additives are added in measured quantities to the ores. The additives themselves can be part of the prior art, in the form of elements, oxides or other suitable salts. Examples of such additive elements are vanadium, copper, cobalt, uranium, tungsten, nickel, molybdenum, manganese, tin, zinc, beryllium, boron, yttrium, niobium, antinomy, bismuth, silver and rare earth elements in the form of oxides or hydroxides. For the catalysts in accordance with the invention, oxides or hydroxides of magnesium, aluminum and/or silicon can be present as impurities in the primary materials, or they can be added intentionally.

Inorganic and/or organic binders may be used to produce the catalysts in accordance with the invention. Examples of such inorganic binders are clays, in particular binder clays, such as bentonite, kaolins, compounds containing aluminum such as aluminum hydroxide and aluminum hydroxychloride, compounds containing magnesium or calcium, and possibly fine-grain or colloidal $SiO_2$ or mixtures of these inorganic binders.

Organic binders which can be used for the manufacture of the catalysts in accordance with the invention include those which are known in the field of refractory materials. Examples of such organic binders are cellulose ether, melting adhesives, sinter powder, phenol resins, in particular phenol novolak. Suitable hardeners, e.g. hexamethylene tetramine, can be used as well as modified furane resins, e.g. furfuryl alcohol resins, which are also used with an appropriate hardener, such as, hexamethylene tetramine.

The amount of inorganic binders is generally 0.05 to 5 parts by weight to 100 parts by weight of the catalytically active materials. The amount of organic binder is generally 0.1 to 4.0 parts by weight to 100 parts by weight of the catalytically active material.

Sulfuric acid is preferably used as the acid to etch the metal carrier means which is in the form of a grid, expanded metal or perforated plate to name a few, but mixtures of sulfuric acid and phosphoric acid can also be used without deviating from the spirit of this invention.

The perforated metal support advantageously is made of iron or steel, but special steels; e.g., stainless, can also be used. The metal carrier means or support, however, advantageously has a minimum of 50% iron by weight. A fabric or grid of iron wire is advantageously used. The wire thickness is between 0.1 and 1.0 mm, preferably between 0.3 and 0.8 mm, and the mesh width is at least 0.5 mm, and advantageously between 1.0 and 4.0 mm.

In the process of this invention for the manufacture of catalysts, first a mortar or a stamping or molding compound is prepared from the catalytically active material using inorganic or organic fluids, but advantageously employing water. In the preparation of such a stamping compound material, an acid can also be added to soften the stamping compound, preferably sulfuric acid or a mixture of sulfuric acid and phosphoric acid. This moist compound is then spread out into a layer; the perforated metal sheet is then placed on or in contact with this layer, and another layer of the moist primary mixture of the catalytically active material is applied to the perforated metal support. Then the combination is pressed together using significant pressure to obtain a mechanically bonded compressed composite body, advantageously the pressure is at least $5N/mm^2$.

If an inorganic and/or organic binder was used; e.g., in the form of a thermosetting synthetic resin, to achieve a more rapid hardening, the pressed composite body is subjected to a temperature above 120° C. (e.g., 200° to 280° C.) for a period of time, preferably between 200° and 280° C.

In one embodiment of the process in accordance with this invention wherein the metal support is etched by a prior acid treatment, the support is immersed in sulfuric acid, advantageously with a concentration between 50 and 98%, or in a mixture of sulfuric acid and phosphoric acid, or is sprayed with such an acid or mixture of acids.

In another embodiment of the invention, wherein the catalytically active material is first applied to both sides of the support and the molded composite is formed, the acid treatment of the metal support and of the catalytically active material is done by immersion or spraying. A suitable immersion time in a sulfuric acid, advantageously having a concentration of between 30 and 60%, or in a mixture of sulfuric acid and phosphoric acid, and with a total thickness of the molded composite body of 2.5 mm, is between 5 and 20 seconds. The composite moldings treated with acid in this manner are then dried at temperatures between 150 degrees C. and 250 degrees C. which may take several hours.

In accordance with another advantageous embodiment, the combination moldings, during whose manufacture the acid or acid mixture required for the etching of the carrier or support was applied either by prior treatment of the perforated metal support, by simultaneous immersion in a mixture with the catalytically active material or by subsequent treatment of the molded composite body, is exposed to a thermal treatment. This thermal treatment is done advantageously with a heating rate between 5° and 20° C. per hour, up to a temperature in the range of 350° to 600° C., advantageously 420° to 480° C. This tempering treatment is preferably conducted in an atmosphere containing 2 to 6% oxygen. The tempering treatment is continued for several hours, generally between 12 and 18 hours. After cooling, a catalytically active composite is obtained, which contains iron sulfate and possibly chromium sulfate, magnesium sulfate, aluminum sulfate, calcium sulfate and sulfates of any added oxides in the catalytically active material.

This invention is explained in greater detail in the following examples.

EXAMPLE 1

2.76 kilograms ("kg") or iron ore with a concentration of 95% $Fe_2O_3$, and containing $SiO_2$, FeO and $Al_2O_3$, a raw density of 3.6 $g/cm^3$ and a total porosity greater than 15% by volume, and a grain size varying from micron size to 1 mm, and 0.03 kg of chromium ore with a concentration of 50% $Cr_2O_3$, and containing MgO, $Fe_2O_3$, $SiO_2$ and $Al_2O_3$ with the same grain size were thoroughly mixed in a turbulence mixer with 0.15 kg of binder clay and 0.04 kg of a pulverized phenol novolak resin. 95 milliliters ("ml") of water were added to this mixture. A first layer of the molding compound placed in the mold of a hydraulic press to a height of 2 to 2.5 mm. Then an annealed iron wire mesh with a wire thickness of 0.6 mm and a mesh width of 2.0 mm was laid on top. Over this iron wire mesh, a second layer of the molding compound was added to a height of 2 to 2.5 mm. Then the entire charge was molded in a press at a pressure of 40 $N/mm^2$. The dimensions of the molding were $150 \times 150 \times 2.5$ mm. For an accelerated hardening of the binder, the composite bodies were exposed for a short period to a temperature of 250° C. in a furnace. The composite bodies were then immersed in a 45% sulfuric acid for 10 seconds and then dried for 2 hours at 200° C. Then, with a heating rate of 10° C./hour, they were tempered in an atmosphere with 2% oxygen at a temperature of 450° C., for 5 hours.

EXAMPLE 2

The same primary mixture as in Example 1 was used, but this primary mixture was mixed only with the binder clay and without pulverized phenol novolak resin. Instead of water, 95 ml of a 60% sulfuric acid was added. The remainder of the process for the manufacture of the molded composite was the same as in Example 1. This molding, after a thermal treatment at 200° C., without immersion in sulfuric acid, was heated to 400° C. with a heating rate of 10° C./h for a temperature for 5 hours at 450° C.

COMPARATIVE TEST

The method described in Example 1 of U.S. Pat. No. 4,806,427 was repeated; i.e., a combination of the same iron ore and chromium ore and binder clay was used. 22% by weight of a 50% sulfuric acid was added to this mixture to produce a slip. This slip was placed in a suitable immersion tank, and the annealed iron wire mesh as used in Example 1 was dipped in this tank three times, with intermediate drying at 200° C. Then the resultant molding was continuously tempered at 450° C.

The catalytic activity and the mechanical strength were determined for the molded composite produced in Example 1 and the composite produced according to the comparison test.

The curve of the catalytic activity is indicated in the accompanying diagram.

The measurements of the catalytic activity were made at different temperatures at an AV value of 6.8 $m^3/m^2 \cdot h$ and an $\alpha$-value (alpha value) (Mol $NH_3$/Mol NO) of 1.05.

The drawing shows that the catalyst manufactured in accordance with the invention has a significantly better catalytic activity than the prior art catalyst used in the comparison test.

Measurements were also made for a temperature of 400° C. at an AV value of 13.6 $m^3/m^2 \cdot h$, whereby the K values were 29 m/h for the catalyst of Example 1 in accordance with the invention, and 21 m/h for the catalyst of the comparison test.

The smallest bending radius at which chipping of the catalytically active components occurred on the wire mesh was also measured for the catalysts manufactured in accordance with Example 1 and the comparison test. This measurement was conducted on catalyst plates with the dimensions 150×150×2.5 mm.

In this case, the smallest possible bending radius of the catalyst in accordance with the comparison test was 180 mm, while the smallest possible bending radius of the catalyst in accordance with the invention in Example 1 was 100 mm.

Additional examples are described below:

EXAMPLE 3

Process according to Example 1, but the iron wire mesh was immersed in 45% sulfuric acid for 1 second before being placed in the mold.

EXAMPLE 4

Process according to Example 1, but 95 ml of 25% sulfuric acid was added to the dry mixture instead of the water. The rest of the process was as in Example 1; i.e., with immersion in 45% sulfuric acid.

EXAMPLE 5

Analogous to Example 4, but the immersion took place in 70 ml of 45% sulfuric acid and 25 ml of 10% phosphoric acid.

EXAMPLE 6

Process as in Example 1, but the iron wire mesh was immersed in 20% phosphoric acid for 1 second before being placed in the mold.

An additional advantage of the process in accordance with the invention is that it is possible to use primary ores or ore mixtures for the catalytically active material having much larger maximum grain sizes than with the process disclosed in U.S. Pat. No. 4,806,427. In the prior art process, either a slip of the ores is used, which requires very fine-grain ore, or else a wire mesh previously treated with acid is powdered while wet with ore which has a grain size of less than 0.1 mm and preferably from 10 to 50 microns. In contrast, in the process in accordance with the invention, the ore is used with grain sizes up to 1 or 2 mm, whereby these maximum grain sizes are ultimately a function only of the thickness of the composite body which can ultimately be molded. Therefore, up to 60% e.g., any significant quantity up to 60% of the ore used can have a grain size of more than 0.5 mm. The more used of the larger grain size, the greater the economy. Thus, 1 to 60% is within the scope of this invention.

Pertinent to this invention are the following patents.

German Patent Publication Published for Opposition Purposes No. DE-AS 23 53 640, which is equivalent to U.S. Pat. No. 3,956,192, entitled "Catalyst Carrier", describes a catalyst carrier with a blank comprising metal wire distributed as uniformly as possible over the volume between support mats, whereby the blank exhibits several layers packed on top of one another and attached to one another consisting of a woven, honeycombed or knitted endless alloy wire, heat resistant up to 800° C.

German Patent Publication Published for Opposition Purposes No. DE-AS 28 46 476 describes a process for the manufacture of sintered blanks which contain titanium dioxide, an active component, and molybdenum oxide as binders for the titanium dioxide, whereby the vaporous molybdenum oxide is deposited on pulverized titanium oxide in an atmosphere of molybdenum oxide vapor at temperatures from 460° C. to 650° C. In this manner, a pulverized mixture is produced which contains the pulverized titanium oxide with the molybdenum oxide deposited on it and the active components, and a quantity of water is added to it so that a viscous mixture is formed. A blank is produced from the kneaded mixture and the blank is calcined to form a sintered product. In this proposal, for example, a plate structure is formed by applying a viscous material, obtained by adding 25 to 35 percent by weight, preferably 24 to 28 percent by weight, water to the pulverized mixture on a porous steel plate. Other plate structures can also be formed, by applying viscous material obtained by adding 20 to 30 percent by weight water to various metal wire meshes.

German Patent No. DE-PS 28 53 023 describes a plate-shaped catalyst, comprising a carrier, a metal intermediate layer applied to it, and a catalytically active component of the prior art deposited on it suitable for the reduction of oxides of nitrogen, $NO_x$, in an exhaust gas, whereby both surfaces of the plate are roughened by spraying these on molten metal. Catalytic substances which can be used for the reduction of the oxides of nitrogen, $NO_x$, contained in an exhaust gas by means of ammonia include titanium and vanadium, or titanium, tungsten and one or more of the elements vanadium, molybdenum or iron. Such catalytic substances were processed prior to the proposal of No. DE-PS 28 53 023, for example, as hydroxide or water-soluble salt into a suspension or paste, which was combined as necessary with a suitable carrier material, to apply the suspension or paste obtained in the form of a coating to a substrate for the catalyst, and then drying or sintering it, to bind it for use to the substrate. Catalytic substances were also bonded to the substrate in the form of oxides or sulfates. No. DE-PS 28 53 023 was intended to demonstrate that portions of the catalytically active substances deposited on the opposite sides of the carrier plate are in connection with one another through the perforation, to make certain that the catalytically active substance deposited on the carrier plate adheres firmly to it.

German Patent No. DE-PS 29 27 246 describes a plate-shaped catalyst for the reduction of nitrogen oxides in exhaust gases with a porous, firmly-adhering metal oxide carrier deposited on metal. A catalytically active component is then applied to the carrier, whereby the catalyst is manufactured by the application of a suspension containing particulate titanium oxide and colloidal silicic acid in a weight ratio of 1:10 to 10:1 on a metal mesh with an open mesh width of 0.147 millimeters to 1.651 millimeters, and whereby the active component is incorporated before, during or after the application. The suspension is thereby formed out of finely-divided titanium oxide and the binder containing the colloidal silicic acid, and is deposited on the metal mesh. The resulting carrier is then dried and immersed in a solution of a salt of the active component, and then dried and fired, if necessary. It is also possible to immerse the metal grid in a coating bath, which contains titanium oxide and binder, the metal grid is then dried, and the carrier formed is immersed in a solution of a salt of the active component. It can then be dried and fired if necessary. It is also possible to immerse the metal grid in a coating bath which contains titanium oxide and binder, then to dry the metal grid and immerse the carrier thus formed in a solution of a salt of the active component, and then to dry and fire it if necessary.

All documents cited herein are incorporated by reference as if set forth herein in their entirety.

In summing up, one aspect of the invention resides in a process for the manufacture of catalysts for the reduction of nitrogen oxides from exhaust gases and chemical air cleaning processes. A catalytically active material which includes iron ores and possibly chromium ores is deposited on a perforated metal support in the form of a grid, expanded metal or perforated sheet, and is mechanically bonded to it by drying and/or tempering and/or firing. The metal support is etched by contact with an acid. The perforated metal support is inserted between two layers of the active material, and the composite is then molded with a pressure of at least 0.5 N/mm².

Another aspect of the invention resides in that a molding pressure of 20 to 80 N/mm² is applied.

Yet another aspect of the invention resides in that a molding pressure of 30 to 60 N/mm² is applied.

Still another aspect of the invention resides in that the metal support is etched by a prior acid treatment.

Still yet another aspect of the invention resides in that the finished, molded composite body is treated with acid to etch the metal support and the catalytically active material.

A further aspect of the invention resides in that the catalytically active material is used together with a pulverized, thermosetting synthetic resin.

A still further aspect of the invention resides in that the thermosetting synthetic resin used is pulverized phenol novolak resin with an appropriate hardener.

The invention as described hereinabove in the context of a preferred embodiment is not to be taken as limited to all of the provided details thereof, since modifications and variations thereof may be made without departing from the spirit and scope of the invention.

What is claimed is:

1. Process for the production of a catalytic member having a catalytically active material and a carrier means comprising the steps of:
   etching the carrier means with an acid etchant;
   contacting the carrier means with the catalytically active material and applying sufficient pressure to the carrier means and the catalytically active material while they are in contact to form a mechanically bonded composite body.

2. The process according to claim 1, wherein the pressure applied is at least 0.5 newtons per square millimeter.

3. The process according to claim 1, wherein the pressure applied is 2 to 5 newtons per square millimeter.

4. The process according to claim 2, wherein the catalytically active material is used together with a thermosetting synthetic resin.

5. The process according to claim 4, wherein the thermosetting resin is pulverized phenol novolak resin.

6. The process according to claim 1, wherein the catalytically active material has a grain size of up to 2 millimeters.

7. The process according to claim 6, wherein the catalytically active material contains up to 60% of such material having a grain size of more than 0.5 millimeters.

8. The process according to claim 2, wherein the carrier means is layered on opposing sides with the catalytically active material before applying pressure.

9. The process according to claim 8, wherein the pressure applied is 20 to 80 newtons per square millimeter.

10. The process according to claim 8, wherein the pressure applied is 30 to 60 newtons per square millimeter.

11. The process according to claim 4, wherein the composite body is treated with an acid etchant to etch the carrier means and the catalytically active material.

12. The process according to claim 4, wherein the carrier means is etched with an acid etchant acid prior to contacting with the catalytically active material.

13. Process for the manufacture of a catalytic member for the reduction of oxides of nitrogen which comprises:
    providing a particulate catalytically active material selected from the group consisting of iron ore, chromium ore, zeolite and combinations thereof;
    depositing said catalytically active material on a metal carrier means having openings;
    thermally bonding the carrier means to the catalytically active material to form a unitary body;
    etching the unitary body with an etchant acid and applying at least 0.5 newtons per square millimeter pressure to the etched unitary body.

14. The process according to claim 13, wherein the carrier means is etched prior to depositing the catalytically active material thereon.

15. The process according to claim 13, wherein the catalytically active material contains from a small but significant amount of catalytically active material to about 60% of such material having a grain size of at least 0.5 millimeters.

16. The process according to claim 13, wherein the pressure applied is 30 to 60 newtons per square millimeter.

17. The process according to claim 13, wherein the carrier means has catalytically active material on two opposing sides.

18. A catalytic member for use in the reduction of oxides of nitrogen comprising a compressed composite body having an etched carrier means with a series of openings sandwiched between two layers of a catalytically active material selected from the group consisting of iron ore, chromium ore, zeolite and combinations thereof.

* * * * *